United States Patent [19]

Kaneko et al.

[11] 3,781,101

[45] Dec. 25, 1973

[54] CINEMATOGRAPHIC CAMERA

[75] Inventors: Keiji Kaneko, Kanagawa; Toshio Yoshida, Saitama, both of Japan

[73] Assignee: Fuji Photo Film Co., Ltd., Minami Ashigara-shi, Kanagawa, Japan

[22] Filed: June 30, 1972

[21] Appl. No.: 267,756

[30] Foreign Application Priority Data
June 30, 1971  Japan................................ 46/48264

[52] U.S. Cl................ 352/221, 352/227, 352/229, 352/230
[51] Int. Cl. ............................................ G03b 1/48
[58] Field of Search................... 352/221, 225, 227, 352/229, 230

[56] References Cited
UNITED STATES PATENTS

| 2,149,218 | 2/1939 | Heinisch | 352/230 |
| 1,350,548 | 8/1920 | Darby | 352/227 |
| 2,174,020 | 9/1939 | Sumner | 352/221 |

Primary Examiner—Monroe H. Hayes
Attorney—Richard C. Sughrue et al.

[57] ABSTRACT

A motion picture camera with a film gate comprising an aperture plate and a pressure plate. The pressure plate holds the film in the camera against the aperture plate only when motion pictures are being taken. The camera includes apparatus for moving the pressure plate to a position where the film is not pressed against the aperture plate when pictures are not being taken. Upon the operation of a part of the camera normally operated when pictures are taken, the pressure plate is released so that it presses the film against the aperture plate.

13 Claims, 8 Drawing Figures 3,781,101

CINEMATOGRAPHIC CAMERA

BACKGROUND OF THE INVENTION

1. Field of the Invention

This invention relates to a cinematographic camera, and in particular to a cinematographic camera provided with a film gate having a pressure plate releasing device.

2. Description of the Prior Art

The ordinary film gate device in a compact cinematographic camera consists of an aperture plate fixed to a portion of the camera body and a pressure plate for pressing the film on the aperture plate. The pressure plate is normally either mounted on the camera body movable relative thereto or mounted on the film magazine loaded into the camera. In both the cases, the pressure plate presses the film onto the aperture plate after the film is loaded in the film loading chamber of the camera body. The purpose of providing a pressure plate in a camera is to stabilize the running of the film when the film feeding mechanism is driven, thereby obtaining a motion picture of good quality. Therefore, the pressing operation of the film pressure plate is not necessary when the film is not moving. Further, it is undesirable to press the film on the aperture plate by means of the pressure plate when the film is not running. This is because the film pressed in the film gate of the cinematographic camera is liable to stick to the aperture plate or the pressure plate due to variation in temperature and humidity within the film loading chamber. The sticking brings about unstable movement of the film when the film starts moving through the film gate. This unstable movement of the film must particularly be avoided in high speed motion pictures. Further, in the prior art cinematographic cameras, the pressure operation of the pressure plate is released only at the time when the film is rewound or reversed for making an overlapping effect. This is accomplished by a means particularly provided in the camera for rewinding the film. The rewinding mechanism of the camera is complicated and the operation of the camera is made cumbersome, thereby causing further problems.

It is therefore necessary to automatically release the pressing of the film in the film gate when the film is not moving. On the other hand, however, the operation of the camera ia made rather cumbersome if the film pressure releasing operation is conducted by a completely different operation from the operation for taking a motion picture. Such a cumbersome operation of the camera is apt to bring about misoperation in taking motion pictures and deterioration in the quality of the images taken.

SUMMARY OF THE INVENTION

Therefore, the primary object of the present invention is to provide a motion picture camera in which the film pressure operation is released in response to an operation which is normally required in the general usage of the motion picture camera.

Another object of the present invention is to provide a motion picture camera in which the film pressure operation is released automatically in response to an operation for releasing a shutter release button.

Another object of the present invention is to provide a motion picture camera in which the film pressure plate is actuated to press the film when the film feeding mechanism starts driving the film.

A further object of the present invention is to provide a motion picture camera in which the film pressure plate is actuated automatically by a lever which is pushed by the forehead of the camera operator when the operator takes a motion picture looking at the object through the camera view finder.

A still further object of the present invention is to provide a motion picture camera in which the film pressure plate is released in response to release of a shutter button and the film driving motor is connected with an electric exposure control means so that the film is not fed when the switch for actuating the electric exposure control means is turned off.

DESCRIPTION OF THE DRAWINGS

Other objects, features and advantages of the present invention will be further described and made explicit in the following description of the preferred embodiments thereof taken in conjunction with the accompanying drawing in which.

DESCRIPTION OF THE PREFERRED EMBODIMENTS

Figure 1:
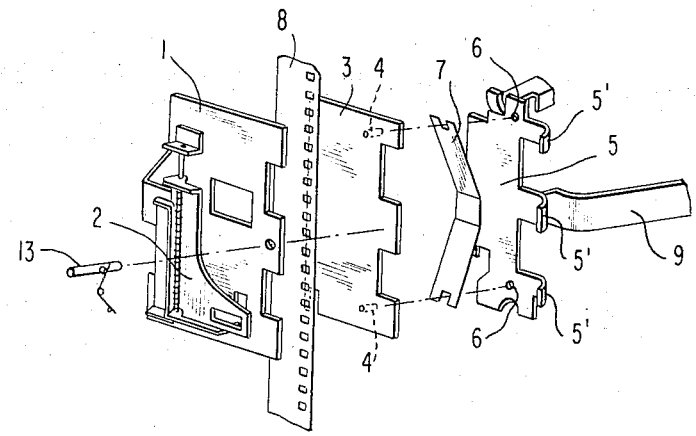
FIG. 1 is an exploded perspective view of a film gate device in a compact motion picture camera in accordance with the present invention.
Figure 2:
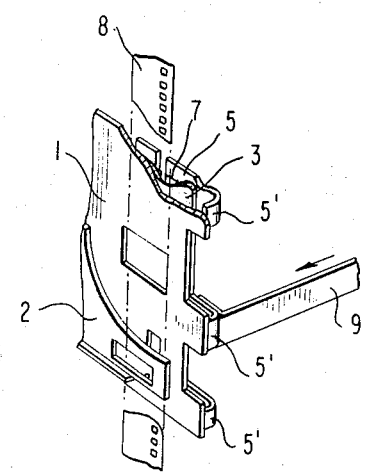
FIG. 2 is a perspective view, partly cut away, of the main portion of the film gate in accordance with the present invention showing the state thereof in which the film is being fed for taking motion pictures.

Now referring to FIGS. 1 and 2 showing perspective views of the film gate portion of the compact motion picture camera in accordance with the present invention, an aperture plate 1 having a film feeding claw device 2 is fixed to a portion of the body of the camera.

The pressure plate 3 is provided with a pair of pins 4 fixed thereto so that the pressure plate 3 may be moved in the direction of the optical axis with the pins 4 guided through holes 6 in back support plate 5. Thus, the pressure plate 3 is made movable along the optical axis between the back support plate 5 and the aperture plate 1. The movement is restricted by the pins 4. The back support plate 5 is provided with a pair of L-shaped projections or bent portions 5' on one side edge extending along the lengthwise direction thereof. The back support plate 5 is swingably movable at the opposite side edge thereof with a proper space between the edge and the aperture plate 1. The swing of the support plate 5 is limited on its front side by the L-shaped projections 5' and on its rear side by means not shown. The pressure plate 3 is normally urged toward the aperture plate 1 by means of a leaf spring 7 interposed between the pressure plate 3 and the back support plate 5 so as to press the film 8 running therethrough against the back surface of the aperture plate 1. This pressure on the film 8 by pressure plate 3 is effected in the following manner. After a film magazine is loaded into the camera, the support plate 5 is swung toward the aperture plate 1 by a lever 9 which is interlocked with some means such as a lock of the side cover of the camera. The means is actuated after the magazine is loaded into the camera. In the first stage, the pressure plate 3 is brought into sliding contact with the film 8 by the movement thereof. Then by the further movement of the back support plate 5 caused by the lever 9, the pressure plate 3, under the spring force of the leaf spring 7 presses the film 8 on the aperture plate 1. Thus, when the L-shaped projections 5' abut on the back surface of the aperture plate 1, the movement of the back support plate 5 is completed and the spring 7 is sufficiently compressed to press the film 8 against the aperture plate 1 for stabilizing the film feed.

Figure 3:
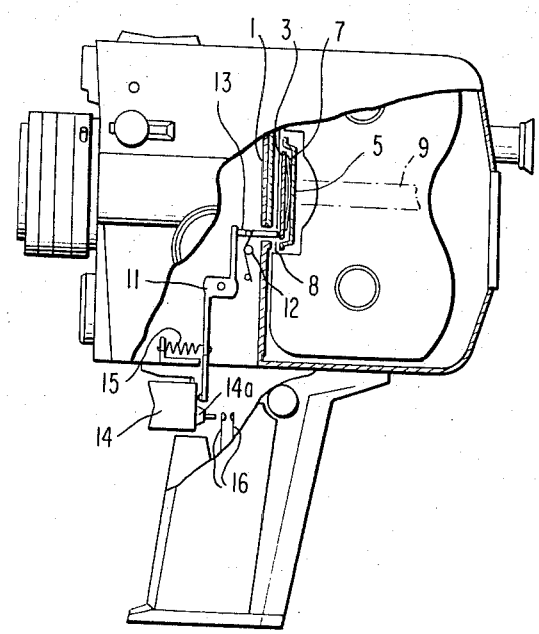
FIG. 3 is a side elevational view, partly in section, of a compact motion picture camera which is provided with a film gate having a film pressure plate releasing means actuated in connection with the pushing of the shutter button, in accordance with an embodiment of the present invention.

FIG. 3 shows an embodiment of the motion picture camera in which the above-described film gate operates with a film pressure release device in accordance with the present invention. In FIG. 3 a pivoted lever 11 is pivotally mounted to a portion of the camera body so that the upper and lower ends of the lever may be moved in the direction of the optical axis of the lens. The upper end of the lever 11 is engaged with a pressure plate pushing pin 13, which is urged to abut the back side of the upper end of the lever 11 by means of a spring 12. The pressure plate pushing pin 13 is made slidable in the direction of the optical axis. The lower end of the lever 11 engages a shutter release button 14. The lower part of the lever 11 is pulled forward by a tension spring 15 which is strong enough to overcome the spring force of the spring 12 and the leaf spring 7 so as to normally push the pressure plate pushing pin 13 to the back limit to release the pressure plate. This removes the pressure of the film against the aperture plate 1. By pushing the shutter release button 14 backward and overcoming the force of the tension spring 15, the lever 11 is moved counterclockwise in FIG. 3 and the pressure plate pushing pin 13 is moved forward by the spring 12. When pushing pin 13 moves forward, pressure plate 3 presses the film against the back side of the aperture plate 1 under the action of leaf spring 7. On the rear end of the shutter button 14 is provided a projection 14a for closing a switch 16 located just behind the shutter button for energizing a film feeding and sector driving motor.

In operation, when the shutter button 14 is pushed down the film pressure plate presses the film on the aperture plate to stabilize the running of the film. In detail, when the shutter button 14 is pushed backward in FIG. 3, the lever 11 is rotated counterclockwise overcoming the spring force of the spring 15 and allowing the pin 13 to slide forward by the spring force of the spring 12 to follow the upper end of the lever 11. Accordingly, the pressure plate 3, which has been pushed backward overcoming the leaf spring 7 by the pin 13, is allowed to move forward, by the force of the leaf spring 7, to press the film on the aperture plate 1. When the back support plate 5 is in its forward position, where the projections 5' are in contact with the aperture plate 1, a space is formed between the aperture plate 1 and the support plate 5. This motion of the back support plate 5 is caused by the lever 9 which is actuated when the film magazine is loaded into the camera. Then, by further pushing the shutter button backward, the switch 16 is closed by the projection 14a provided on the rear end of the shutter button 14 to start the film feeding and sector driving. When the shutter button 14 is released (shutter release is stopped), the switch 16 is opened to stop the film feeding and sector driving. At the same time, the lever 11 is moved or rotated clockwise by the spring force of the tension spring 15. The pin 13 slides backward overcoming the force of leaf spring 7 to release the pressure plate 3 from its position pressing the film 8 on the aperture plate 1.

Figure 4:
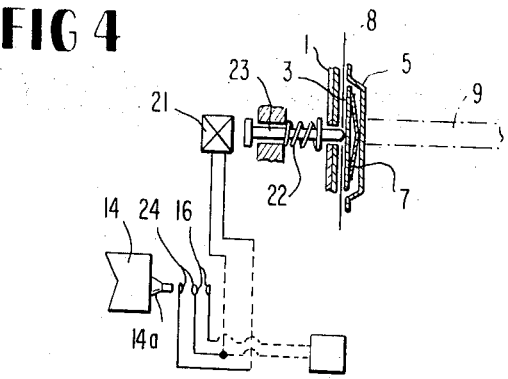
FIG. 4 is a schematic side sectional view of a film pressure releasing means utilizing a magnet in accordance with another embodiment of the present invention.

Another embodiment of the film pressure plate releasing device is shown in FIG. 4 wherein the elements corresponding to those shown in the FIG. 3 embodiment are designated by the same reference numerals. In this second embodiment, a switch 16 for energizing the film feeding and sector driving means is provided with another switch 24 so that the second switch 24 may be closed prior to the first switch 16. The switch 24 energizes an electromagnet 21 which is located just in front of a pressure plate pushing pin 23 which is in turn spring biased to push the pressure plate 3 backward. The backward movement of pushing pin 23 prevents the pressing of film 8 against the aperture plate. Pressure pin 23 is moved backwards by means of a compression spring 22. The pressure plate pushing pin 23 is normally held in its back position, to push the pressure plate 3 backward, by means of the spring 22 overcoming the force of the leaf spring 7, interposed between the back support plate 5 and the pressure plate 3. When the shutter button 14 is pushed backward by a finger, the pin 23 is attracted forward by the electromagnet 21 energized by the switch 24. Then by further pushing the shutter button 14, the switch 16 is closed with the switch 24 remaining closed and the film feeding means and the sector driving means are energized to carry out the normal motion picture taking operation. When the shutter button 14 is released, the motor driving switch 16 is first opened to stop the motion picture taking operation and then the switch 24 is opened to de-energize the electromagnet 21 thereby releasing the pin 23. Thus, the pin 23 is moved backward by the force of the spring 22, which overcomes the force of spring 7, to move the pressure plate 3 backward to prevent the plate 3 from pressing the film 8 against the aperture plate 1.

As will be understood from the foregoing embodiments of the invention, the amount of movement of the film pressure plate is very small. The backward movement of the pressure plate together with the back support plate and the leaf spring is limited to the extent that the perforations of the film keep in engagement with a film feeding claw.

Other embodiments of the invention are possible, where the film pressing operation, by the film pressure plate 3, is actuated by means of an operation member other than the shutter button such as in the previously described embodiments. In other words, it is possible to actuate the pressure plate pressing pin 13 or 23 in response to an operation of any member which is actuated prior to the film feeding and sector driving operation.

Figure 5:
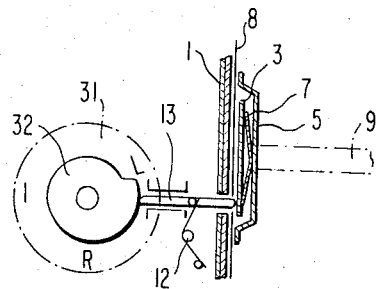
FIG. 5 is a schematic side sectional view showing a film pressure releasing means together with a film feed speed changing dial.

One such embodiment is shown in FIG. 5, in which an eccentric cam member 32 is provided on a dial 31 for switching the film feeding speed by an external manual operation. The cam member 32 is engaged with the pressure plate pressing pin 13 which is spring biased to follow the cam member 32. The maximum radius portion of the cam member 32 is designed to be at the position of the Lock position (shown at L) of the film feeding speed switching dial 31. Therefore, the pressing operation of the film pressure plate 3 is precluded in response to the operation of the dial 31 to the lock position to lock the shutter button when the camera is not used.

Figure 6:
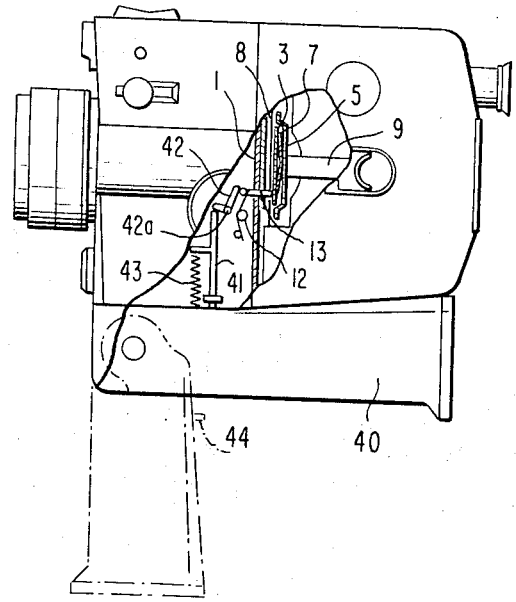
FIG. 6 is a side elevational view, partly in section, of a compact motion picture camera of the type having a foldable grip, in which a film pressure releasing means is provided in accordance with another embodiment of the present invention.

Another embodiment of the invention is shown in FIG. 6 in which a foldable grip of the motion picture camera is used for moving the pressure plate pressing pin 13. In this embodiment, an actuation lever 41 is provided in the camera with the upper end thereof engaged with an L-shaped lever 42 pivotally mounted on a stationary pivot 42a. Lever 42 engages the pin 13. Actuation lever 41 is urged downward by a tension spring 43 so that it may be in its lower position. When lever 41 is in its lower position the pin 13, which is spring biased to the left by means of a spring 12, allows the pressure plate 3 to press the film 8 against aperture plate 1. The actuation lever 41 is in its lower position when the grip 40 is in the taking or down position as indicated by the dashed line. The grip 40 is provided with a projection 44 which is to be brought into engagement with the actuation lever 41 when the grip 40 is brought to its folded or up position as shown in FIG. 6. Thus, when the grip 40 is folded, the pressure plate 3 is moved backward by the pin 13 releasing the pressure on the film. When the grip 40 is lowered to its taking position, the pressure plate 3 is moved to the pressing position to stabilize the running of the film 8.

Figure 7:
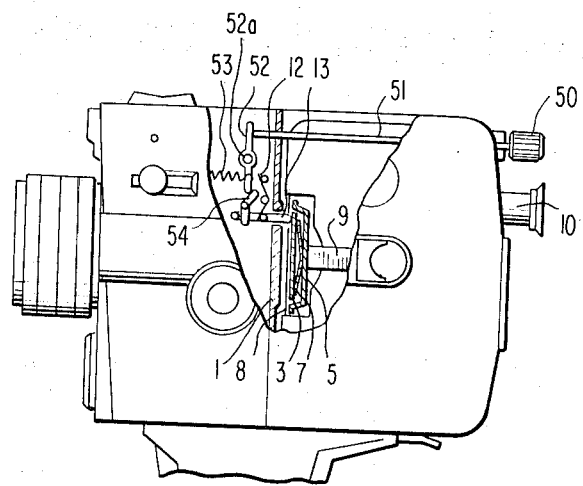
FIG. 7 is a side elevational view, partly in section, of a compact motion picture camera which is provided with a film pressure plate releasing means actuated in connection with the pushing of an actuating lever projected above the view finder thereof in accordance with still another embodiment of the present invention.

Still another embodiment of the invention is shown in FIG. 7 in which a push button member 50 is provided above the view finder 10 so that the buttom member 50 may be pushed inward by the forehead of the photographer who looks into the view finder 10. An actuation lever or rod 51 is fixed to the push button member 50 and is engaged at the left end thereof with a lever 52 which is pivotally mounted to a stationary pivot 52a and spring biased clockwise by means of a tension spring 53. Another lever 54 is interlocked between the lever 52 and the pressure plate pushing pin 13 so that the pin 13 may be moved leftward to make the pressure plate 3 move to the left to press the film 8 against the aperture plate 1 when the lever 52 is rotated counterclockwise by the actuation lever 51. The force of the tension spring 53 is overcome when the push button 50 is pushed inward by the forehead of the photographer. When the push button 50 is released to move outward or to the right, the lever 52 is rotated clockwise by the tension of the spring 53. The pin 13 is moved to the right by the lever 54 under the force of spring 12. Thus, the pressure plate 3 is moved to the right, overcoming the force of the leaf spring 7, thereby releasing the pressure on film 8.

Figure 8:
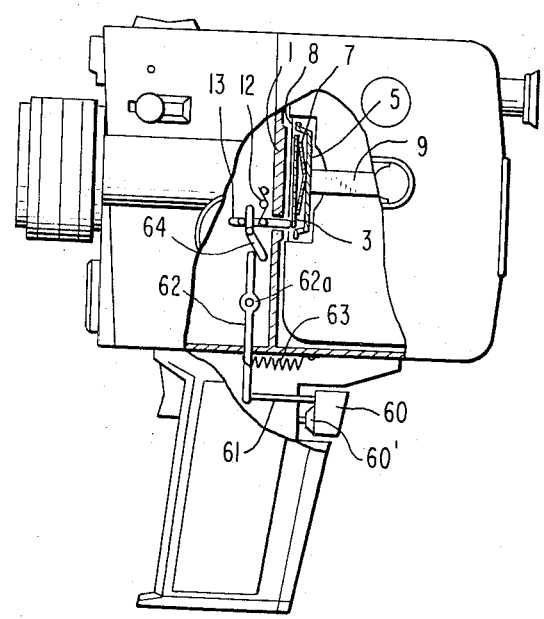
FIG. 8 is a side elevational view, partly in section, of a compact motion picture camera which is provided with a film pressure plate releasing means actuated in connection with a switch for energizing an automatic electric exposure controlling means in accordance with a further embodiment of the present invention.

A further embodiment of the present invention is shown in FIG. 8 in which the pressure plate pushing pin 13 is interlocked with an EE switch which is actuated to energize an automatic exposure control circuit. Generally, an automatic exposure control circuit is energized prior to actuation of the film feeding and sector driving means. In other words, the EE switch is normally actuated prior to actuation of the shutter button. Further, the shutter driving and film feeding means may not be operated when the EE switch is not closed. The term "EE" comes from a Japanese expression "Electric Eye" which means an automatic exposure control means built into the camera. As clearly shown in FIG. 8, an EE switch button 60 is interlocked with the pin 13 by way of an actuation rod 61 integrally fixed to the buttom 60. An actuation lever 62 is pivotally mounted on a stationary pivot 62a and is spring biased counterclockwise by means of a tension spring 63, and a lever 64. The interlocking means is almost the same as that employed in the foregoing embodiments. Therefore, by pushing the EE switch 60, the pin 13 moves to the left in FIG. 8 to make the pressure plate 3 press the film 8 against aperture plate 1. By releasing the button 60 to return it to its right position, the pin 13 is moved to the right by the spring force of the spring 12, to keep the pressure plate 3 in its retracted position. The reference numeral 60' shown in FIG. 8 designates a projection provided on the button 60 for actuation of a switch to energize the automatic exposure control means in the camera.

It will be readily understood that in the foregoing embodiments shown in FIGS. 5 to 8 the switch 24 shown in FIG. 4 for energizing an electromagnet 21 can be employed instead of the actuation lever mechanism including the actuation lever 11 and other relevant members.

What is claimed is:

1. In a motion picture camera having a film gate device including an aperture plate, a pressure plate and a spring for urging the pressure plate toward the aperture plate to press a film against the aperture plate, the improvement comprising:

film pressure operation releasing means for releasing said pressure plate when motion pictures are not being taken such that the film is pressed against the aperture plate by the pressure plate only during the taking of motion pictures, said film pressure operation releasing means comprising:

a. first means acting directly on said pressure plate for pushing said pressure plate away from said aperture plate against said spring to a retracted position; and b. second means acting directly on said pressure plate for overcoming the action of said first means in response to an operation normally required for taking motion pictures wherein upon overcoming the action of the first means the pressure plate passes the film against the aperture plate.

2. In a motion picture camera having a film gate device including an aperture plate, a pressure plate and a spring for urging the pressure plate toward the aperture plate to press a film against said aperture plate, the improvement comprising:

film pressure operation releasing means for releasing said pressure plate when motion pictures are not being taken such that the film is pressed against the aperture plate by the pressure plate only during the taking of motion pictures, said film pressure operation releasing means comprising:

a. first means, including a first biasing spring for pushing said pressure plate away from said aperture plate, said first biasing spring normally urging said first means away from the position for pushing said pressure plate;

b. second means, including a second biasing spring, for moving said first means to a position where said pressure plate is away from said aperture plate, said second biasing spring normally urging said second means for moving said first means in a manner that said pressure plate is away from said aperture plate, wherein the second biasing spring has a force sufficient to overcome the force of the first biasing spring; and c. third means for moving said second means to a position where it does not affect said first means whereby said first means moves to a position under the action of the first biasing spring such that said pressure plate pushes said film against said aperture plate, wherein said third means overcomes the force of said second biasing means, said third means operating in response to an operation normally required for taking motion pictures.

3. A motion picture camera as defined in claim 2 wherein said third means is a shutter release button.

4. A motion picture camera as defined in claim 1 wherein said first means comprises a metal pin spring biased to push against the pressure plate, and said second means comprises an electromagnet to attract said metal pin, and means for energizing said electromagnet.

5. A motion picture camera as defined in claim 4 wherein said means for energizing said electromagnet comprises means actuated in response to a shutter release operation.

6. A motion picture camera as defined in claim 5 wherein said electromagnet is energized by closing a first switch provided just behind a shutter release, wherein said first switch is closed when the shutter button is operated.

7. A motion picture camera as defined in claim 6 wherein said first switch is provided in series with a second switch for energizing a film feeding means and a sector driving means, wherein said first and second switches may be closed by pushing down the shutter button and wherein said first switch is closed prior to said second switch.

8. A motion picture camera as defined in claim 1 wherein said first means comprises a pin for pushing said pressure plate backward to a retracted position, said first means being spring biased in a direction away from the pressure plate, such that said pressure plate presses the film against the aperture plate, and said second means comprises a cam member fixed concentrically to a film feed speed changing dial, said cam having its maximum radius portion at the locking position where the dial locks the shutter button release, said pin following said cam member against the action of its spring bias.

9. A motion picture camera as defined in claim 1 wherein said first means comprises a pin spring-biased in the direction away from said pressure plate, and said second means comprises an actuation member engaged with said pin and spring biased in a direction to release said pin, said actuation member being held against its spring bias by a foldable grip of the camera which abuts said actuation member, whereby said actuation member is moved by the action of its spring bias to release said pin, when the grip is erected to a picture taking position.

10. A motion picture camera as defined in claim 9 wherein said actuation member includes an L-shaped lever for engaging said pin and for transmitting the movement of said actuation member to said pin.

11. A motion picture camera as defined in claim 1 wherein said first means comprises a pressure plate pushing pin spring biased to push the pressure plate away from the aperture plate and a lever interlocked with said pin, spring biased in a direction to allow said pin to push the pressure plate, and said second means comprises an actuation member actuated in response to operation of a push member which is pushed prior to operation for taking motion pictures, said actuation member being interlocked with said lever whereby said lever is moved to overcome the spring bias of said first means when said push member is pushed.

12. A motion picture camera as defined in claim 11 wherein said push member is a push button member projected above an eye-piece of the camera, wherein said push button is pushed inwardly by the forehead of the photographer.

13. A motion picture camera as defined in claim 11 wherein said push member is a push button switch for energizing an automatic exposure control means in the camera.

* * * * *